June 7, 1932.　　　　S. S. McDONALD　　　　1,861,810
VEHICLE WHEEL
Filed Jan. 24, 1930　　　　3 Sheets-Sheet 1

INVENTOR:
Steve S. McDonald.
BY
O O Martin
his ATTORNEY.

June 7, 1932.  S. S. McDONALD  1,861,810
VEHICLE WHEEL
Filed Jan. 24, 1930  3 Sheets-Sheet 2

INVENTOR:
Steve S. McDonald
BY
O. O. Martin
his ATTORNEY.

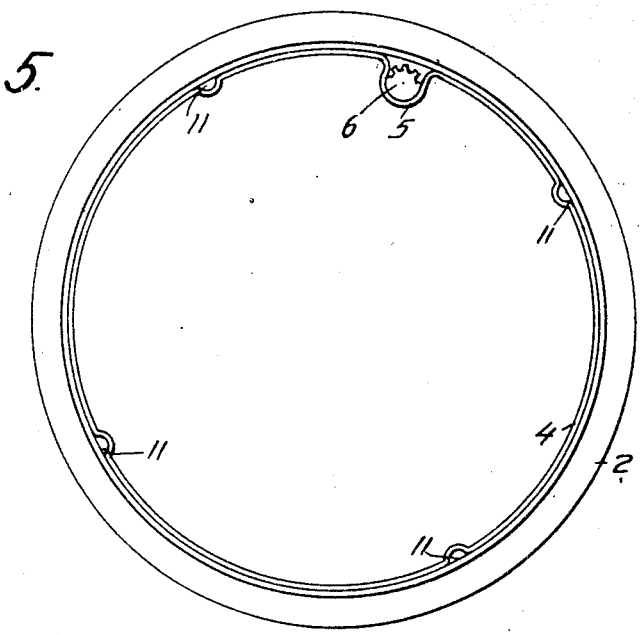
Fig. 5.
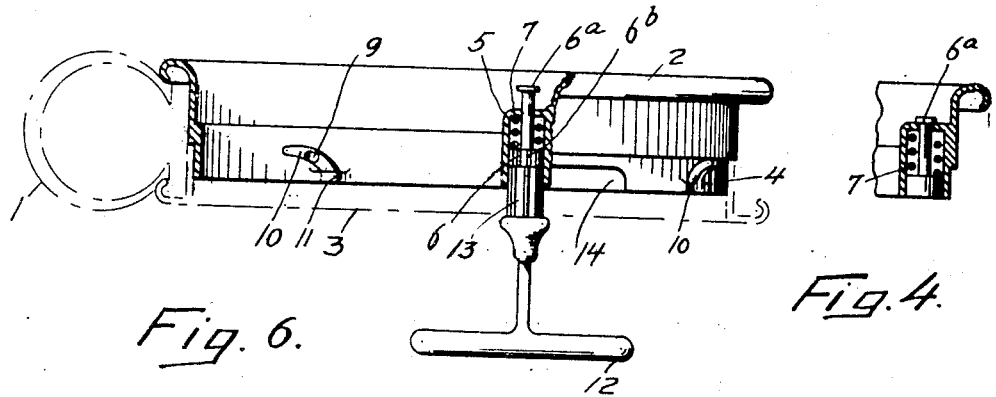
Fig. 6.
Fig. 4.
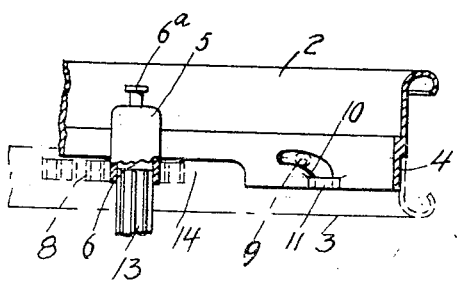
Fig. 7.
INVENTOR:
Steve S. McDonald
BY
his ATTORNEY.

Patented June 7, 1932

1,861,810

UNITED STATES PATENT OFFICE

STEVE S. McDONALD, OF LOS ANGELES, CALIFORNIA

VEHICLE WHEEL

Application filed January 24, 1930. Serial No. 423,086.

This invention has relation to vehicle wheels and refers particularly to wheels provided with pneumatic tires.

The general object of my invention is the provision of a sturdy, dust and grit proof wheel and tire construction of pleasing appearance. A further object is to provide a structure, in which the tire may be quickly detached from the wheel by one simple turning movement of a convenient key, and another tire be mounted and as quickly locked in position by turning the same key.

Figure 1:
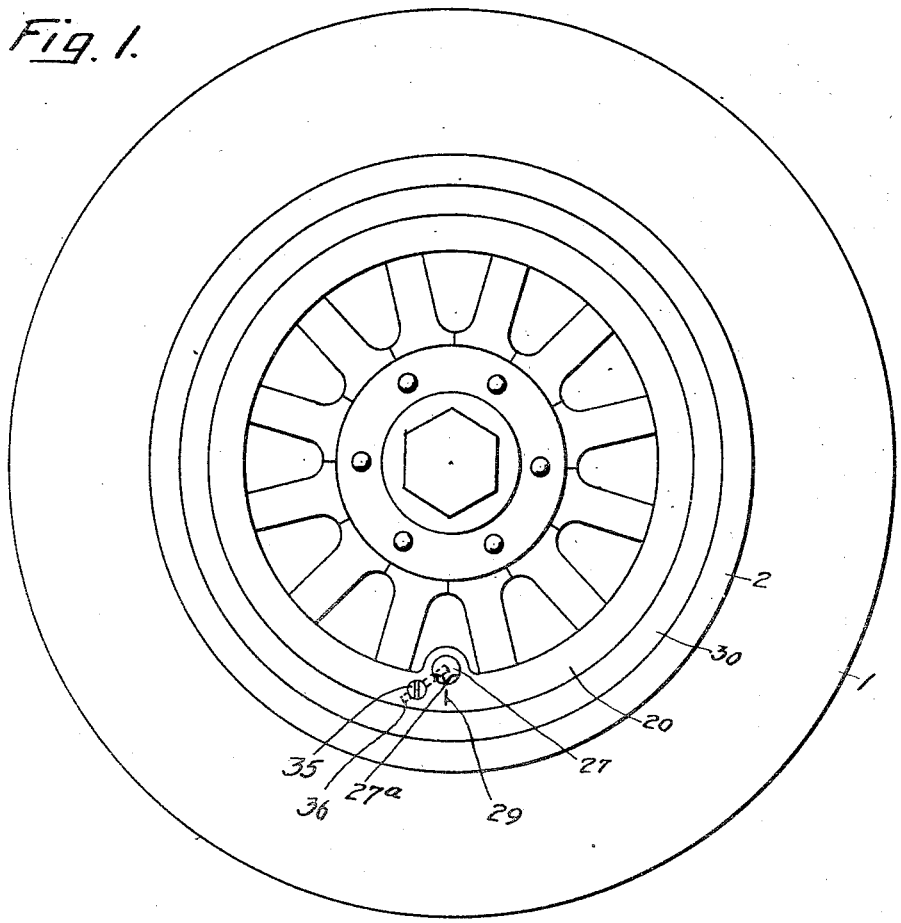
Figure 8:
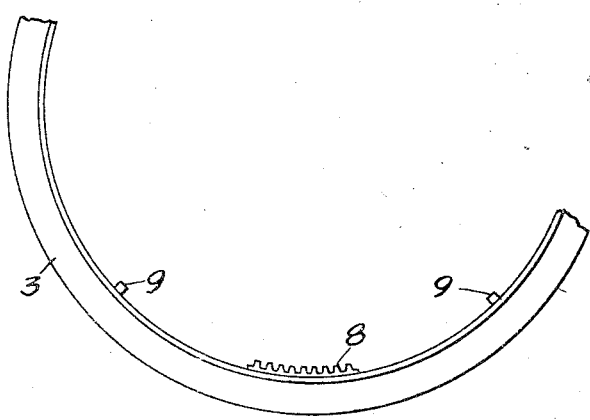
Figure 2:
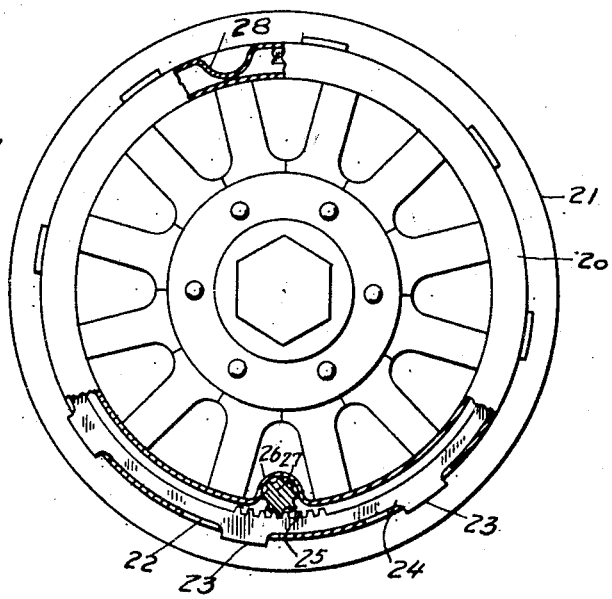
Figure 3:
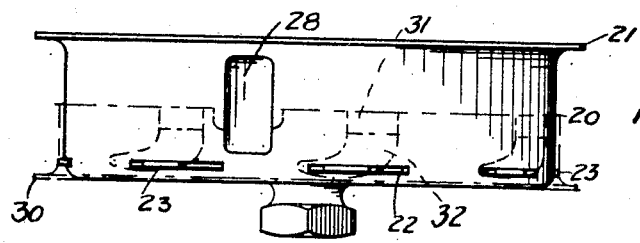
Figure 9:
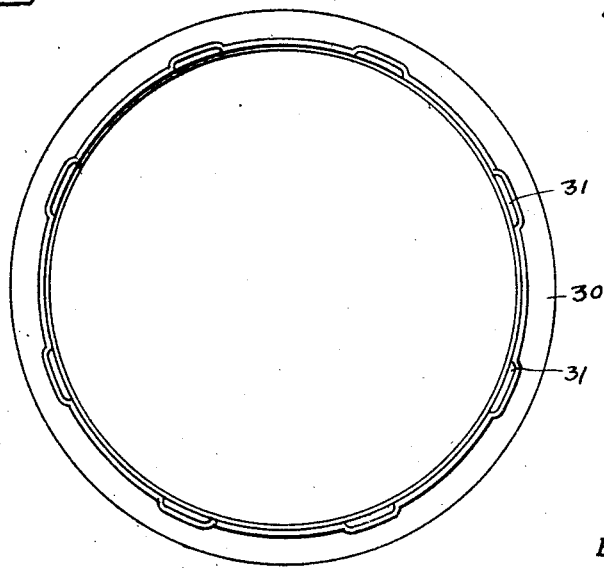
Figure 10:
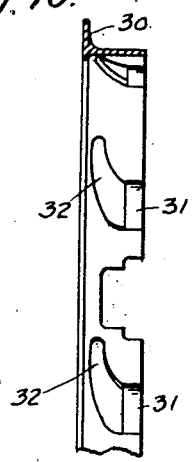

Another object is to provide a tire rim separable from the tire it supports by a similar simple turn of the same key. These and the further objects and many advantageous features of my invention are hereinafter fully set forth and illustrated in the appended drawings, of which:

Fig. 1 shows my wheel structure when completely assembled,

Fig. 2 is a substantially corresponding side elevation of the wheel, after the tire has been removed and with parts broken away for the sake of clearness, Fig. 3 is a plan view substantially in agreement with Fig. 2, Figs. 4, 5 and 6 illustrate the members of the tire rim and the method of locking these members together, Fig. 7 is a fragmentary view of the tire rim members, as they appear from the opposite side, Figs. 8, 9 and 10 illustrate the member employed to lock the assembled tire rim on the wheel.

The structure of my invention is designed for use in connection with any commercial make of pneumatic tire 1, on which the rim of my invention is seated in the following manner. The rim comprises two members 2 and 3, the latter of which is of a size to fit snugly over a reduced portion 4 of the member 2, as best indicated in Figs. 6 and 7, in broken outline. On the inner periphery of the member 2 is rigidly secured a cylindrical housing 5, within which a plunger 6 is seated to slide, and this plunger is held normally advanced by a spring 7, the advance movement being limited by a head 6ª. In the periphery of this plunger is cut a plurality of gear teeth 6ᵇ for engagement with a toothed rack 8 of the member 3, see also Fig. 8. In the latter is fastened a plurality of inwardly projecting studs 9, which are caused to enter alined cam slots 10 of the member 2, through marginal offsets 11.

The member 3 is thereupon given a slight rotation on the member 2, causing the studs 9 to travel along the cam slots 10, until the two members become tightly locked together. In order to facilitate this operation, I have provided a key 12, terminating in a gear pinion 13. This key is manipulated to push the pinion 13 into the casing 5, against the tension of the spring 7, until the pinion teeth come into mesh with the teeth of the rack 8 and pushes the receding plunger 6 out of engagement with said rack. A slight turn of the key suffices to lock the members together.

The key is then withdrawn, whereupon the plunger again is caused to move forward, by the pressure of the spring 7, into engagement with the rack 8 and far enough to close the housing 5. Should, however the plunger fail to advance, it is only necessary to re-insert the key and to turn it a trifle further, until the teeth of the plunger become properly alined with the rack 8. It is to be noted, that the member 2 is recessed at 14, in order to afford operating space for the rack 8.

From the foregoing description it is seen, that a turn of the key suffices to lock the rim members together around the tire, and the operation is so simple that the spare rim, usually carried on automobiles, may be eliminated and only a spare tire carried, if desired.

The wheel, upon which the above described tire structure is mountable, is made with a metal rim 20, terminating in a flange 21. In the outer periphery of this rim is cut a series of narrow slots 22, through which a corresponding series of cam projections 23 extend. These projections are shown to be integral with an annular plate 24, in the inner periphery of which is cut a series of gear teeth 25. In the rim is provided an inwardly projecting enlargement 26, in which a spring held plunger 27 is seated. This device may be substantially a duplicate of the plunger mechanism 6, and it is operated by the same key 12 to rotate the cam plate 24, within the limits of the slots 22.

A locking flange 30 is shown in Figs. 9 and 10. In the periphery of this flange is pressed a series of offsets 31, leading into cam slots 32. These offsets are proportioned and positioned to register with the projections 23, the result being, that the projections are free to pass through these offsets and into the cam slots 32, when the flange 30 is pushed on to the wheel rim 20. The key is then pushed into the housing 26 and turned to rotate the cam plate 24, thereby causing the projections 23 to advance in the cam slots 32 and to lock the flange 30 in position on the wheel.

Before placing the flange 30 it is, however, necessary to mount the tire rim and tire on the wheel, and this is readily accomplished. In the periphery of the wheel is provided a depression, or pocket 28. The operator picks up the assembled tire and turns it until the housing 5 is in line with this pocket, into which he then pushes the housing, whereupon the tire combination is free to drop into position on the wheel, on which it fits freely enough to admit the locking flange 30.

When the entire structure is assembled, as shown in Fig. 1, the various members fit snugly within each other, so as not to admit dust and dirt. The end of the plunger 27 may conveniently be made with a pointer 27ª for registration with a line 29 of the wheel rim, for the purpose properly of alining the teeth of the plunger with the rack 25, for ready engagement.

Referring now to Fig. 1, attention is called to the numeral 35, which denotes the tumbler of an ordinary tumbler lock, adapted to throw a bolt 36 into a socket of the plunger 27, thereby to lock this plunger against longitudinal movement by the key 12, or any suitable tool that might be substituted. In this manner an effective means is provided for locking the tire on the wheel, an advantage not ordinarily found, and which aids in the prevention of tire and rim thefts. This tumbler mechanism may, of course, be embodied into the plunger itself, but for the sake of clearness it is in the drawings shown separately.

I claim:

1. A wheel having an annular tubular felly comprising, an inner peripheral wall, an outer peripheral wall terminating on one side in an annular flange and integral side walls, an annular member within the felly and provided with cam projections seated in apertures of the outer wall for engaging rim cams, and means for rotating said member to engage such cams to lock a rim in position on the wheel, there being in the outer felly wall, diametrally opposite said rotating means, a pocket of a size to receive a rim projection for the purpose of rim alinement.

2. A wheel having an annular tubular felly terminating on one side in a flange, an annular member enclosed within the felly and made with cams radially projecting through the outer felly periphery on the side opposite said flange, there being two diametrically opposite pockets in the inner and outer felly periphery intermediate said flange and cams, means within the felly and seated in said inner pocket for rotating said member, the outer pocket being shaped to receive a rim projection for the purpose of rim alinement.

In testimony whereof I have hereunto affixed my signature.

STEVE S. McDONALD.